United States Patent
Gerold

(10) Patent No.: US 7,645,336 B2
(45) Date of Patent: Jan. 12, 2010

(54) AZO PIGMENT PREPARATION

(75) Inventor: Juergen Gerold, Bodenheim (DE)

(73) Assignee: Clariant Produkte (Deutschland) GmbH, Frankfurt (DE)

(*) Notice: Subject to any disclaimer, the term of this patent is extended or adjusted under 35 U.S.C. 154(b) by 11 days.

(21) Appl. No.: 12/086,930

(22) PCT Filed: Nov. 16, 2006

(86) PCT No.: PCT/EP2006/010980

§ 371 (c)(1),
(2), (4) Date: Jun. 20, 2008

(87) PCT Pub. No.: WO2007/079813

PCT Pub. Date: Jul. 19, 2007

(65) Prior Publication Data

US 2009/0025600 A1    Jan. 29, 2009

(30) Foreign Application Priority Data

Dec. 21, 2005   (DE) .................... 10 2005 061 066

(51) Int. Cl.
C09B 41/00    (2006.01)
C09B 67/18    (2006.01)
C09B 67/20    (2006.01)
C09D 11/02    (2006.01)

(52) U.S. Cl. .................... 106/496; 106/31.75; 106/31.8

(58) Field of Classification Search ............... 106/31.75, 106/31.8, 496

See application file for complete search history.

(56) References Cited

U.S. PATENT DOCUMENTS

| 3,347,917 A | | 10/1967 | Arthur |
| 3,653,936 A | | 4/1972 | Wolf et al. |
| 3,661,982 A | * | 5/1972 | Beswick .................... 562/590 |
| 4,515,639 A | | 5/1985 | Dopfer et al. |
| 5,196,594 A | * | 3/1993 | Schmelzer et al. .......... 564/452 |
| 5,382,288 A | | 1/1995 | Schenk et al. |

FOREIGN PATENT DOCUMENTS

| CA | 859191 A | * | 12/1970 |
| DE | 4334790 | | 4/1995 |
| EP | 0057880 | | 8/1982 |
| EP | 0062304 | | 10/1982 |
| EP | 0567918 | | 11/1983 |

OTHER PUBLICATIONS

PCT International Search Report for PCT/EP 2006/010980 mailed Jun. 29, 2007.
English translation of the International Preliminary Report on Patentability for PCT/EP 2006/010980, Sep. 12, 2008.
English Abstract for EP 0062304, Oct. 13, 1982.
English Abstract for DE 4334790, Apr. 20, 1995.

* cited by examiner

*Primary Examiner*—Anthony J Green
(74) *Attorney, Agent, or Firm*—Anthony A. Bisulca

(57) ABSTRACT

The invention relates to an azo pigment preparation which is characterized by a content in 4,4'-diaminodicyclohexyl-methane, the percentage of the trans,trans-isomer being at least 25%, based on the total amount of 4,4'-diaminodicyclo-hexylmethane. The azo pigment preparation according to the invention is especially suitable for producing gravure inks having improved optical density, higher luster and no ink show-through in the gravure printing of illustrations.

14 Claims, No Drawings

AZO PIGMENT PREPARATION

The present invention relates to the field of amine-formulated azo pigments, which are particularly used in printing inks, for example in publication gravure printing.

EP 0 057 880 A1 discloses that strong, readily flowable and readily dispersible azo pigment formulations are obtained on adding a long-chain aliphatic primary amine and a diamine of the formula $H_2N$—A—$NH_2$, where A is an aliphatic hydrocarbyl radical of 6 to 30 carbon atoms, during or after coupling. 4,4'-Diaminodicyclohexylmethane is an example of diamines of the formula $H_2N$—A—$NH_2$. The compound is commercially available and typically comprises a mixture of three stereoisomers, viz, the cis,cis-isomer, the cis,trans-isomer and the trans,trans-isomer, and it was found that the trans,trans fraction is below 20%:

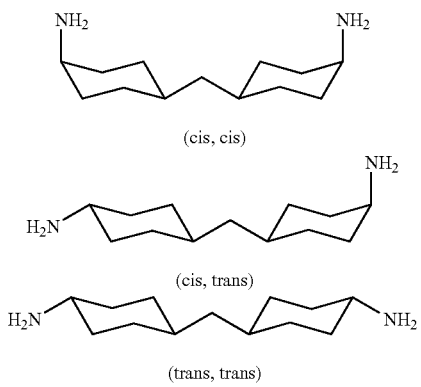

DE 43 34 790 A1 and U.S. Pat. No. 3,347,917 disclose processes whereby 4,4'-diaminodicyclohexylmethane having a high content of trans,trans-isomer is obtainable. One existing method comprises for example reacting an isomeric mixture of 4,4'-diaminodicyclohexylmethane in toluene with two equivalents of benzaldehyde to form the corresponding 4,4'-di(benzylidene-amino)dicyclohexylmethane. The entire isomeric mixture is then isomerized by base catalysis in dimethoxyethane solvent to the thermodynamically most stable trans,trans-diamine. Hydrolysis of the Schiff base gives isomerically pure trans,trans-4,4'-diaminodicyclohexylmethane. 4,4'-Diaminodicyclohexylmethane having a high trans,trans fraction is of interest for large scale industrial manufacture of polyurethane elastomers having improved material properties, such as thermal stability and solvent resistance (DE 43 34 790 A1).

It is an object of the present invention to provide azo pigment formulations for use in gravure printing inks in particular that are notable for improved optical density, higher gloss and non-strikethrough in publication gravure printing.

I have found that this object is achieved, surprisingly, by an azo pigment formulation comprising 4,4'-diaminodicyclohexylmethane having an enhanced fraction of trans,trans-isomer.

The present invention accordingly provides an azo pigment formulation comprising 4,4'-diaminodicyclohexylmethane wherein the fraction of the trans,trans-isomer is at least 25%, based on the total amount of 4,4'-diaminodicyclohexylmethane.

The production of pure trans,trans-isomer is technically inconvenient. The use of pure trans,trans-isomer is possible, but in fact not necessary for the purposes of the present invention. It is economically and technically sufficient to limit the fraction of trans,trans-isomer to the range from 25% to 75% and in particular to the range from 35% to 60%, based on the total amount of 4,4'-diaminodicyclohexylmethane.

I have found that, irrespectively of the total amount of 4,4'-diamino-dicyclohexylmethane used, the fraction of the cic,cis- and cis,trans-isomers in the isomeric mixture should not be higher than 75% in total. A disruption in the crystal lattice of the azo pigment due to non-planar stereoisomers may be responsible for a deterioration in coloristic properties.

The amount of 4,4'-diaminodicyclohexylmethane used, i.e., generally a stereoisomeric mixture having a trans,trans fraction which is in accordance with the present invention, is advantageously in the range from 2% to 30% by weight and preferably in the range from 5% to 20% by weight, based on the weight of the azo pigment.

Useful azo pigments include all products used in printing inks, preferably diaryl yellow pigments, especially of the acetoacetylarylamide series. Particular preference is given to C.I. Pigment Yellow 12, 13, 14, 17, 55, 63, 81, 83, 87, 90, 106, 113, 114, 121, 124, 126, 127, 136, 152, 170, 171, 172, 174, 176 and 188 and also C.I. Pigment Red 53:1. C.I. Pigment Yellow 12 is very particularly preferred.

The azo pigment formulations of the present invention preferably further comprise long-chain aliphatic primary amines of 6 to 30 carbon atoms, for example cocoamine, oleylamine, stearylamine, tallowamine, alkylalkylene-diamines such as, for example, tallowpropylenediamine, or tallowdipropylenetriamine. The content of long-chain aliphatic primary amines of 6 to 30 carbon atoms is preferably in the range from 1% to 30% by weight and particularly in the range from 5% to 20% by weight, based on the total weight of the azo pigment formulation. Instead of the amines mentioned, it is also possible to use their salts, for example acetates.

The mixing ratio of the long-chain aliphatic primary amine to the 4,4'-diaminodicyclohexylmethane can vary within certain limits and depends on the target properties of the particular pigment. The best relations are readily determined by simple preliminary tests.

It may further be advantageous to add 1% to 25% by weight and in particular 2% to 20% by weight, based on the total weight of the azo pigment formulation, of an additive selected from the group consisting of fatty alcohol polyglycol ethers, alkylphenol polyglycol ethers, quaternary ammonium salts of fatty amines and fatty amine N-oxides or a combination thereof. Examples include stearyltrimethylammonium chloride, cetyltrimethylammonium chloride, cocoalkyltrimethylammonium chloride, cocoalkyldimethylbenzylammonium chloride, dodecylbenzyldimethyl-ammonium chloride, dicocoalkyldimethylammonium chloride, distearyl-dimethylammonium chloride, ditallowalkyldimethylammonium chloride and cocoalkyldimethylamine oxide.

The pigment formulations of the present invention, as well as the components mentioned, may further comprise customary auxiliaries or adjuncts, for example surfactants, pigmentary and nonpigmentary dispersants, fillers, standardizers, resins, waxes, defoamers, antidust agents, extenders, antistats, shading colorants, preservatives, drying retarders, rheology control additives, wetting agents, antioxidants, UV absorbers and light stabilizers, biocides or a combination thereof, preferably in an amount of 0.1% to 25% by weight and in particular 0.5% to 15% by weight, based on the total weight of the pigment preparation.

The present invention further provides a process for producing an azo pigment formulation, which comprises adding the 4,4'-diamino-dicyclohexylmethane having a trans,trans fraction of at least 25% before, during or after azo coupling, but before isolation of the azo pigment. For example, it is used as a precipitation auxiliary in the precipitation of the coupling component; added to the coupling liquor after coupling; or added as a formulant to the press cake. It may further be added in a subsequent finishing operation. The aforementioned long-chain aliphatic primary amines and also the additives can be added together with the 4,4'-diamino-dicyclohexylmethane or separately therefrom.

The pigment suspension is further worked up in a conventional manner, as by filtration, washing, drying and grinding, to obtain a readily dispersible azo pigment formulation which provides very strong, readily flowable printing ink, in particular toluene-based gravure printing inks, whereby glossy and non-strikethrough prints are obtained.

The pigment formulations of the present invention can be used for pigmenting macromolecular organic materials of natural or synthetic origin, for example plastics, resins, coatings, paints, electrophotographic toners and developers, electret materials, color filters and also liquid inks, printing inks and seed. Particular preference, however, is given to their use in the manufacture of printing inks, in particular toluene-based gravure printing inks.

The present invention also provides a printing ink, in particular gravure printing ink, comprising the azo pigment formulation of the present invention.

EXAMPLES

Preparation of Enriched Trans,Trans-4,4'-Diaminodicyclohexylmethane

The method of Examples 1 to 3 of DE 43 34 790 A1 was used to prepare a sufficient amount of 4,4'-diaminodicyclohexylmethane having an approximately 75% trans,trans fraction (determined by $^1$H NMR spectroscopy) which was admixed to commercially available 4,4'-diamino-dicyclohexylmethane. (less than 20% trans,trans-isomer) to give a product comprising 40% trans,trans- or 25% trans,trans-isomer, which was used in the examples which follow.

Example 1

P.Y. 12

38 g of 3,3'-dichlorobenzidine (DCB) are stirred up in 245 g of an ice-water mixture and 106 g of 31% hydrochloric acid to form a homogeneous suspension and bisdiazotized at 0-15° C. via continuous addition of 57 g of 38% sodium nitrite solution. Excess nitrite at the end of the diazotization is destroyed by addition of about 0.5 g of amidosulfonic acid.

53.2 g of acetoacetanilide are introduced into 684 g of water and 57.5 g of 50% aqueous sodium hydroxide solution. Careful stirring gives a clear solution which is cooled down to 0-5° C. 2 g of oleylamine acetate are added and the coupling component is subsequently precipitated by addition of 25.4 g of 80% acetic acid.

The coupling reaction is carried out by metering the DCB tetrazo solution underneath the surface of the precipitated coupling component at a constant rate within 60 min. After the reaction has ended, the temperature is raised to 40° C. and 2.5 g of dodecylbenzyldimethylammonium chloride, 10 g of tallowalkylpropylenediamine and also 4.8 g of 4,4'-diaminodicyclo-hexylmethane having a trans,trans content of 40% are added. The reaction mixture is heated to 90-100° C. and the temperature is maintained for 30 min. About 49.5 g of 50% aqueous sodium hydroxide solution are added for an alkaline pH and the temperature is maintained at 90-100° C. for a further 2 h. The product is subsequently filtered, washed, dried and ground.

The pigment formulation prepared according to Example 1 has good dispersibility and is notable for providing toluene-based gravure printing inks giving very glossy and non-strikethrough prints of high optical density.

Example 2

An azo pigment formulation is prepared according to Example 1 except that 4,4'-diaminodicyclohexylmethane having a trans,trans content of 25% is used.

A pigment formulation prepared according to Example 2 provides, compared with Example 1, a gravure printing ink which has a slightly increased viscosity and prints of good gloss and comparable optical densities.

Comparative Example

An azo pigment formulation is prepared according to Example 1 except that 4,4'-diaminodicyclohexylmethane having a trans,trans content of about 20% is used.

A pigment formulation prepared according to the comparative example provides, compared with Example 1, a gravure printing ink of distinctly increased viscosity and prints produced therefrom of lower gloss, lower color strength and distinctly lower optical densities.

Example 3

An azo pigment formulation is prepared according to Example 1 except that 7.4 g of 4,4'-diaminodicyclohexylmethane are used. A pigment formulation prepared according to Example 3 provides, compared with Example 1, a gravure printing ink having a redder hue; prints produced therefrom are notable for improved gloss and higher optical densities, particularly at great well depths.

Example 4

An azo pigment formulation is prepared according to Example 1 except that the 4,4'-diaminodicyclohexylmethane is added before the coupling step. A product having comparable properties is obtained.

Example 5

An azo pigment formulation is prepared according to Example 1 except that the 4,4'-diaminodicyclohexylmethane is added to the press cake after filtration. The press cake is subsequently homogenized, dried and ground. A product having comparable properties is obtained.

Example 6

P.Y. 126

An azo pigment formulation is prepared according to Example 1 except that 6 g of the acetoacetanilide are replaced by 7 g of acetoacet-p-anisidide. A reddish product is obtained.

Example 7

An azo pigment formulation is prepared according to Example 1 except that 2.8 g of the acetoacetanilide are replaced by 4.7 g of the potassium salt of p-acetoacetylaminobenzenesulfonic acid.

A pigment formulation is obtained which, compared with Example 1, gives a more greenish gravure printing ink; prints produced therefrom are notable for increased transparency.

Example 8

P.Y. 114

An azo pigment formulation is prepared according to Example 1 except that 6 g of the acetoacetanilide used are replaced by 6.5 g of acetoacet-p-toluidide. A reddish product is obtained; a toluene-based gravure printing ink prepared therefrom gives prints of improved optical density.

Example 9

An azo pigment formulation is prepared according to Example 1 except that the tallowpropylenediamine used is replaced by tallowdipropylenetriamine. A more greenish pigment formulation is obtained with comparable properties to those of Example 1.

Example 10

An azo pigment formulation is prepared according to Example 9 except that the tallowdipropylenetriamine is added before the coupling step. A pigment formulation having comparable properties is obtained.

Example 11

Mixture of P.O. 13+P.Y. 12

5.3 g of 1-phenyl-3-methyl-5-pyrazolone (PMP) are suspended in 100 g of water and 2.8 g of 50% aqueous sodium hydroxide solution and stirred up until a clear solution is obtained. The PMP is then precipitated by gradual addition of 2.8 g of 80% acetic acid. In a separate vessel, 47.9 g of acetoacetanilide are stirred in 616 g of water and 51.8 g of 50% aqueous sodium hydroxide solution to form a clear solution. It is cooled to 0-5° C. and admixed with 2 g of oleylamine acetate and the acetoacetanilide is precipitated by addition of 25.4 g of 80% acetic acid.

The coupling reaction is carried out by adding sufficient of a DCB tetrazo solution prepared according to Example 1 until a slight diazo excess is detectable. In a second coupling step, the precipitated acetoacetanilide is added to the reaction mixture and the coupling reaction is completed with the rest of the DCB tetrazo solution. The further formulation of the pigment is effected as indicated in Example 1. Compared with Example 1, a more reddish pigment formulation is obtained and a printing ink produced therefrom is lower in viscosity and stronger in printing.

Example 12

5.3 g of PMP and 47.9 g of acetoacetanilide are suspended in 716 g of water and 54.6 g of 50% aqueous sodium hydroxide solution and the suspension is stirred until a clear solution is obtained. It is cooled down to 0-5° C. and admixed with 2 g of oleylamine acetate and the coupling components are precipitated by addition of 28.2 g of 80% acetic acid. The coupling reaction is carried out within 90 min by addition of a DCB tetrazo solution prepared according to Example 1. The further formulation of the pigment is effected as indicated in Example 1.

Compared with Example 1, a more reddish pigment formulation is obtained; a printing ink produced therefrom is lower in viscosity and stronger in printing.

I claim:

1. An azo pigment formulation comprising 4,4'-diaminodicyclohexyl-methane wherein a fraction of trans,trans-isomer is at least 25% based on a total amount of 4,4'-diaminodicyclohexylmethane.

2. The azo pigment formulation as claimed in claim 1 wherein the fraction of the trans,trans-isomer is in the range from 25% to 75%, based on the total amount of 4,4'-diaminodicyclohexylmethane.

3. The azo pigment formulation as claimed in claim 1, wherein the fraction of the trans,trans-isomer is in the range from 35% to 60%, based on the total amount of 4,4'-diaminodicyclohexylmethane.

4. The azo pigment formulation as claimed in claim 1, wherein the formulation has a 4,4'-diaminodicyclohexylmethane content of 2% to 30% by weight, based on the weight of the azo pigment.

5. The azo pigment formulation as claimed in claim 1, wherein the formulation has a 4,4'-diaminodicyclohexylmethane content of 5% to 20% by weight, based on the weight of the azo pigment.

6. The azo pigment formulation as claimed in claim 1, further comprising a long-chain aliphatic primary amine of 6 to 30 carbon atoms.

7. The azo pigment formulation as claimed in claim 1, further comprising a long-chain aliphatic primary amine of 6 to 30 carbon atoms present in an amount of 1% to 30% by weight, based on the total weight of the azo pigment formulation.

8. The azo pigment formulation as claimed in claim 1, wherein the azo pigment is a diaryl yellow pigment.

9. The azo pigment formulation as claimed in claim 1, wherein the azo pigment is C.I. Pigment Yellow 12, 13, 14, 17, 55, 63, 81, 83, 87, 90, 106, 113, 114, 121, 124, 126, 127, 136, 152, 170, 171, 172, 174, 176, 188 or C.I. Pigment Red 53:1.

10. The azo pigment formulation as claimed in claim 1, further comprising 1% to 25% by weight, based on the total weight of the azo pigment formulation, of an additive selected from the group consisting of fatty alcohol polyglycol ethers, alkylphenol polyglycol ethers, quaternary ammonium salts of fatty amines, fatty amine N-oxides and a combination thereof.

11. A process for producing an azo pigment formulation as claimed in claim 1, comprising the step of adding the 4,4'-diaminodicyclohexylmethane having a trans,trans fraction of at least 25% before, during or after azo coupling, but before isolation of the azo pigment.

12. A macromolecular organic material of natural or synthetic origin comprising an azo pigment formulation as claimed in claim 1.

13. A process for the manufacture of a printing ink comprising the step of adding an azo pigment formulation as claimed in claim 1 during the manufacture of the printing ink.

14. A printing ink comprising an azo pigment formulation as claimed in claim 1.

* * * * *